United States Patent
Chen et al.

(10) Patent No.: US 11,799,994 B2
(45) Date of Patent: Oct. 24, 2023

(54) ANTENNA TUNING METHOD AND APPARATUS, AND STORAGE MEDIUM

(71) Applicant: HUIZHOU TCL MOBILE COMMUNICATION CO., LTD., HuiZhou (CN)

(72) Inventors: Lei Chen, HuiZhou (CN); Liyun Liu, HuiZhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 107 days.

(21) Appl. No.: 17/620,704

(22) PCT Filed: Dec. 19, 2019

(86) PCT No.: PCT/CN2019/126675
§ 371 (c)(1),
(2) Date: Dec. 19, 2021

(87) PCT Pub. No.: WO2021/114356
PCT Pub. Date: Jun. 17, 2021

(65) Prior Publication Data
US 2022/0247844 A1 Aug. 4, 2022

(30) Foreign Application Priority Data

Dec. 10, 2019 (CN) .......................... 201911260805.9

(51) Int. Cl.
*H04M 1/02* (2006.01)

(52) U.S. Cl.
CPC ................................ *H04M 1/0235* (2013.01)

(58) Field of Classification Search
CPC .. H04M 1/0235; H04M 1/0241; H04M 1/026; H04B 1/18
See application file for complete search history.

(56) References Cited

U.S. PATENT DOCUMENTS

| | | | |
|---|---|---|---|
| 7,676,245 B2 * | 3/2010 | Laiho | H01Q 1/084 455/90.3 |
| 8,604,995 B2 | 12/2013 | Hammad | |
| 9,472,095 B2 | 10/2016 | Kishinami | |
| 10,128,890 B2 | 11/2018 | Thomas et al. | |

(Continued)

FOREIGN PATENT DOCUMENTS

| | | |
|---|---|---|
| CN | 1656780 A | 8/2005 |
| CN | 101743557 A | 6/2010 |

(Continued)

OTHER PUBLICATIONS

Translation of CN-110323548-A as cited above, Oct. 2019 (Year: 2019).*

(Continued)

*Primary Examiner* — Lewis G West
(74) *Attorney, Agent, or Firm* — Mark M. Friedman

(57) ABSTRACT

Disclosed are an antenna tuning method and apparatus, and a storage medium. The antenna tuning method is applied in a mobile terminal and comprises: detecting the current sliding state of a cover body in a mobile terminal, the sliding state comprising s a sliding open state and a sliding closed state; and tuning an antenna in the cover body according to the current sliding state.

14 Claims, 3 Drawing Sheets

(56) References Cited

U.S. PATENT DOCUMENTS

| | | | |
|---|---|---|---|
| 10,840,582 B2 | 11/2020 | Woo | |
| 11,184,987 B1* | 11/2021 | Jung | G06F 1/1652 |
| 2004/0204000 A1 | 10/2004 | Dietrich | |
| 2006/0155391 A1* | 7/2006 | Pistemaa | H04M 1/0214 |
| | | | 348/E5.025 |
| 2008/0001829 A1 | 1/2008 | Rahola et al. | |
| 2010/0216447 A1* | 8/2010 | Park | H04M 1/0235 |
| | | | 455/418 |
| 2010/0302216 A1 | 12/2010 | Hibino et al. | |
| 2011/0148719 A1* | 6/2011 | Okajima | H01Q 1/243 |
| | | | 343/702 |
| 2012/0302189 A1* | 11/2012 | Han | H01P 1/2084 |
| | | | 455/192.2 |
| 2012/0306705 A1* | 12/2012 | Sakurai | H01Q 15/0086 |
| | | | 343/702 |
| 2015/0340757 A1* | 11/2015 | Rho | H01Q 5/342 |
| | | | 343/702 |
| 2018/0041239 A1* | 2/2018 | Youn | G06F 1/1698 |

FOREIGN PATENT DOCUMENTS

| | | | | |
|---|---|---|---|---|
| CN | 201656977 U | 11/2010 | | |
| CN | 101902232 A | 12/2010 | | |
| CN | 201839326 U | 5/2011 | | |
| CN | 103262507 A | 8/2013 | | |
| CN | 105977640 A | 9/2016 | | |
| CN | 109690868 A | 4/2019 | | |
| CN | 110323546 A | 10/2019 | | |
| CN | 110323548 A | * 10/2019 | | H01Q 1/22 |
| CN | 110323548 A | 10/2019 | | |
| CN | 110324444 A | 10/2019 | | |
| CN | 110416699 A | 11/2019 | | |
| CN | 110445917 A | 11/2019 | | |
| CN | 111010470 A | 4/2020 | | |
| EP | 2110962 A1 | 10/2009 | | |
| EP | 1735917 B1 | 8/2010 | | |

OTHER PUBLICATIONS

International Search Report and the Written Opinion dated Aug. 12, 2020 From the International Searching Authority Re. Application No. PCT/CN2019/126675 and Its Translation of Search Report Into English (3 Pages).

The First Office Action and Search Report dated Sep. 16, 2020, for Huizhou TCL Mobile Communication CO., LTD., from China Application No. 201911260805.9.

The Notice of Allowance and Search Report dated Jul. 6, 2021, for Huizhou TCL Mobile Communication CO., LTD., from China Application No. 201911260805.9.

* cited by examiner

ANTENNA TUNING METHOD AND APPARATUS, AND STORAGE MEDIUM

CROSS REFERENCE

This application is a US national phase application based upon an International Application No. PCT/CN2019/126675, filed on Dec. 19, 2019, which claims the priority of Chinese Patent Application No. 201911260805.9, entitled "ANTENNA TUNING METHOD AND APPARATUS, AND STORAGE MEDIUM", filed on Dec. 10, 2019, the disclosure of which is incorporated herein by reference in its entirety.

FIELD OF THE INVENTION

The present invention relates to a communication technology, and more particularly, to an antenna tuning method, a device, and a storage medium.

BACKGROUND

As the progress of the mobile internet technology, a big-screen terminal has been accepted by users and becomes a new trend. The screen-to-body ratio of a terminal represents the ratio of the area of the display screen and the area of the front screen. When the screen-to-body ratio is higher, the display area is larger so the user could have a better display effect.

Conventionally, in order to raise the screen-to-body ratio, a full-screen terminal is provided. The full-screen terminal has a sliding cover, which includes an upper cover and a lower cover capable of sliding relatively to each other. In this case, the camera, the microphone or any other front-panel components that could affect the screen-to-body ratio are all positioned on the top surface of the lower cover. When the upper cover slides backward the above-mentioned components, those components could be exposed. This could prevent the camera, the microphone or any other front-panel components from affecting the screen-to-body ratio.

However, in the conventional full-screen terminal, the ratio frequency (RF) circuit is also positioned on the top surface of the lower cover. This means that the antenna of the RF circuit is in different conditions when the upper cover slides to two ends of its track. Most of the time, the antenna could only satisfy one of the conditions and does not have a good performance in the other condition.

SUMMARY

One objective of an embodiment of the present invention is to provide an antenna tuning method, a device, and a storage medium, in order to ensure that the antenna could have an optimal performance when the cover of the mobile terminal is in the sliding in condition and the sliding away condition.

According to an embodiment of the present invention, an antenna tuning method used in a mobile terminal is disclosed. The antenna tuning method comprises detecting a sliding condition of a cover of the mobile terminal, wherein the sliding condition comprises a sliding away condition and a sliding in condition; and performing a tuning operation on an antenna in the cover according to the sliding condition of the cover.

Furthermore, the cover comprises a lower cover and an upper cover connected to the lower cover, the lower cover and the lower cover are capable of relatively sliding such that the cover lies in the sliding away condition or the sliding in condition, and a distance sensor is placed in the cover. The step of detecting the sliding condition of the cover of the mobile terminal comprises: utilizing the distance sensor to detect whether an upper end of the lower cover is covered by the upper cover; determining that the sliding condition is the sliding in condition if the upper end of the lower cover is covered by the upper cover; and determining that the sliding condition is the sliding away condition if the upper end of the lower cover is not covered by the upper cover.

Furthermore, the distance sensor is a supersonic distance sensor, and the step of utilizing the distance sensor to detect whether the upper end of the lower cover is covered by the upper cover comprises: controlling the supersonic distance sensor to emit a supersonic wave having a specific frequency and utilizing the supersonic distance sensor to receive a reflected supersonic wave; and determining whether a signal amplitude of the reflected supersonic wave is larger than a predetermined threshold amplitude.

Furthermore, the step of performing the tuning operation on the antenna in the cover according to the sliding condition of the cover comprises: determining a predetermined tuning parameter corresponding to the sliding condition; and performing the tuning operation on the antenna according to the predetermined tuning parameter.

Furthermore, the method further comprises following steps before the step of determining the predetermined tuning parameter corresponding to the sliding condition: establishing a data table, storing a corresponding relationship between the sliding away condition and a first predetermined tuning parameter and a corresponding relationship between the sliding in condition and a second predetermined tuning parameter; and the step of the determining the predetermined tuning parameter corresponding to the sliding condition comprises: obtaining the first predetermined tuning parameter corresponding to the sliding away condition from the data table if the sliding condition is the sliding away condition; and obtaining the second predetermined tuning parameter corresponding to the sliding in condition from the data table if the sliding condition is the sliding in condition.

Furthermore, an antenna tuner is positioned in the cover, the antenna tuner is electrically connected to the antenna in the cover and the step of performing the tuning operation on the antenna according to the predetermined tuning parameter comprises: adjusting an antenna tuning parameter of the antenna tuner to be the predetermined tuning parameter to perform the tuning operation on the antenna; wherein the antenna tuning parameter comprises a capacitance and/or an inductance.

Furthermore, the step of adjusting the antenna tuning parameter of the antenna tuner to be the predetermined tuning parameter comprises: adjusting the antenna tuning parameter of the antenna tuner to be the first predetermined tuning parameter when the cover lies in sliding away condition; and adjusting the antenna tuning parameter of the antenna tuner to be the second predetermined tuning parameter when the cover lies in sliding in condition.

According to an embodiment of the present invention, an antenna tuning device used in a mobile terminal is disclosed. The antenna tuning device comprises: a detecting module, configured to detect a sliding condition of a cover of the mobile terminal, wherein the sliding condition comprises a sliding away condition and a sliding in condition; and a tuning module, configured to perform a tuning operation on an antenna in the cover according to the sliding condition of the cover.

Furthermore, the cover comprises a lower cover and an upper cover connected to the lower cover, the lower cover and the lower cover are capable of relatively sliding such that the cover lies in the sliding away condition or the sliding in condition, and the antenna tuning device further comprises a distance sensor placed in the cover. The detecting module is further configured to utilize the distance sensor to detect whether an upper end of the lower cover is covered by the upper cover, to determine that the sliding condition is the sliding in condition if the upper end of the lower cover is covered by the upper cover, and to determine that the sliding condition is the sliding away condition if the upper end of the lower cover is not covered by the upper cover.

Furthermore, the distance sensor is a supersonic distance sensor, and the operation of utilizing the distance sensor to detect whether the upper end of the lower cover is covered by the upper cover comprises: controlling the supersonic distance sensor to emit a supersonic wave having a specific frequency and utilizing the supersonic distance sensor to receive a reflected supersonic wave; and determining whether a signal amplitude of the reflected supersonic wave is larger than a predetermined threshold amplitude.

Furthermore, the tuning module comprises: a determining unit, configured to determine a predetermined tuning parameter corresponding to the sliding condition; and a tuning unit, configured to perform the tuning operation on the antenna according to the predetermined tuning parameter.

Furthermore, the antenna tuning device further comprises: an establishing module, configured to, before the predetermined tuning parameter is determined, establish a data table, storing a corresponding relationship between the sliding away condition and a first predetermined tuning parameter and a corresponding relationship between the sliding in condition and a second predetermined tuning parameter; and the determining unit is configured to obtain the first predetermined tuning parameter corresponding to the sliding away condition from the data table if the sliding condition is the sliding away condition, and to obtain the second predetermined tuning parameter corresponding to the sliding in condition from the data table if the sliding condition is the sliding in condition.

Furthermore, the antenna tuning device further comprises: an antenna tuner, positioned in the cover and electrically connected to the antenna, configured to adjust an antenna tuning parameter of the antenna tuner to be the predetermined tuning parameter to perform the tuning operation on the antenna; wherein the antenna tuning parameter comprises a capacitance and/or an inductance.

Furthermore, the operation of adjusting the antenna tuning parameter of the antenna tuner to be the predetermined tuning parameter comprises: adjusting the antenna tuning parameter of the antenna tuner to be the first predetermined tuning parameter when the cover lies in sliding away condition; and adjusting the antenna tuning parameter of the antenna tuner to be the second predetermined tuning parameter when the cover lies in sliding in condition.

According to an embodiment of the present invention, a computer readable medium storing a plurality of instructions is disclosed. The instructions are executed by a processing unit to perform following operations: detecting a sliding condition of a cover of the mobile terminal, wherein the sliding condition comprises a sliding away condition and a sliding in condition; and performing a tuning operation on an antenna in the cover according to the sliding condition of the cover.

Furthermore, the cover comprises a lower cover and an upper cover connected to the lower cover, the lower cover and the lower cover are capable of relatively sliding such that the cover lies in the sliding away condition or the sliding in condition, and a distance sensor is placed in the cover. The operation of detecting the sliding condition of the cover of the mobile terminal comprises: utilizing the distance sensor to detect whether an upper end of the lower cover is covered by the upper cover; determining that the sliding condition is the sliding in condition if the upper end of the lower cover is covered by the upper cover; and determining that the sliding condition is the sliding away condition if the upper end of the lower cover is not covered by the upper cover.

Furthermore, the distance sensor is a supersonic distance sensor, and the operation of utilizing the distance sensor to detect whether the upper end of the lower cover is covered by the upper cover comprises: controlling the supersonic distance sensor to emit a supersonic wave having a specific frequency and utilizing the supersonic distance sensor to receive a reflected supersonic wave; and determining whether a signal amplitude of the reflected supersonic wave is larger than a predetermined threshold amplitude.

Furthermore, the operation of performing the tuning operation on the antenna in the cover according to the sliding condition of the cover comprises: determining a predetermined tuning parameter corresponding to the sliding condition; and performing the tuning operation on the antenna according to the predetermined tuning parameter.

Furthermore, before the operation of determining the predetermined tuning parameter corresponding to the sliding condition, the plurality of instructions are executable by the processing unit to perform following operations: establishing a data table, storing a corresponding relationship between the sliding away condition and a first predetermined tuning parameter and a corresponding relationship between the sliding in condition and a second predetermined tuning parameter; and the operation of the determining the predetermined tuning parameter corresponding to the sliding condition comprises: obtaining the first predetermined tuning parameter corresponding to the sliding away condition from the data table if the sliding condition is the sliding away condition; and obtaining the second predetermined tuning parameter corresponding to the sliding in condition from the data table if the sliding condition is the sliding in condition.

Furthermore, an antenna tuner is positioned in the cover, the antenna tuner is electrically connected to the antenna in the cover and the operation of performing the tuning operation on the antenna according to the predetermined tuning parameter comprises: adjusting an antenna tuning parameter of the antenna tuner to be the predetermined tuning parameter to perform the tuning operation on the antenna; wherein the antenna tuning parameter comprises a capacitance and/or an inductance.

In contrast to the conventional art, the antenna tuning method of an embodiment could detect a sliding condition of a cover of the mobile terminal, where the sliding condition comprises a sliding away condition and a sliding in condition; and perform a tuning operation on an antenna in the cover according to the sliding condition of the cover. In this way, the antenna tuning method could ensure the mobile terminal could have an optimal antenna performance when the cover of the mobile terminal is in the sliding in condition and the sliding away condition.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

The present disclosure a method for tuning an antenna, a device and a storage medium. These and other features, aspects and advantages of the present disclosure will become understood with reference to the following description, appended claims and accompanying figures.

Conventionally, when the cover is in the sliding in condition or the sliding away condition, the antenna could only satisfy one of the conditions and does not have a good performance in the other condition. In order to solve this issue, an antenna tuning method is provided to ensure that the antenna could have an optimal performance when the cover of the mobile terminal is in the sliding in condition and the sliding away condition.

Figure 1:
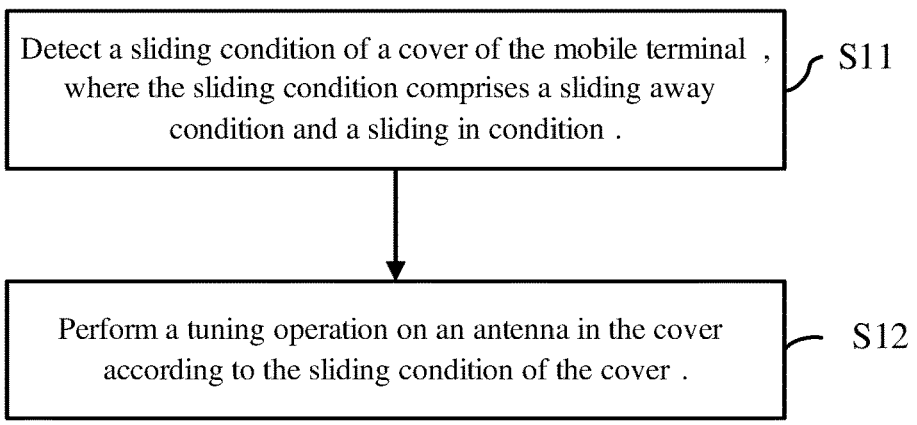
FIG. 1 is a flow chart of an antenna tuning method according to an embodiment of the present invention.

Please refer to FIG. 1. FIG. 1 is a flow chart of an antenna tuning method according to an embodiment of the present invention. The antenna tuning method is used in a mobile terminal. The antenna tuning method comprises:

S11: Detect a sliding condition of a cover of the mobile terminal, wherein the sliding condition comprises a sliding away condition and a sliding in condition.

Figure 2:
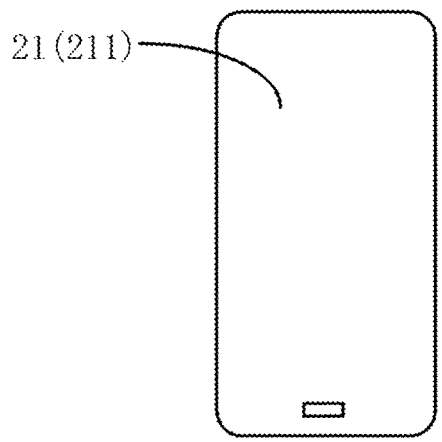
FIG. 2 is a diagram of a mobile terminal according to an embodiment of the present invention.
Figure 3:
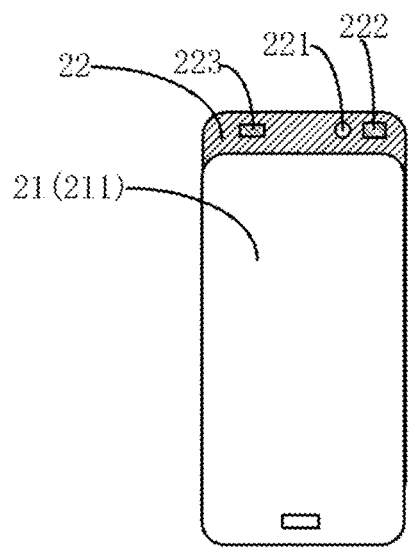
FIG. 3 is a diagram of a mobile terminal according to another embodiment of the present invention.
Figure 4:
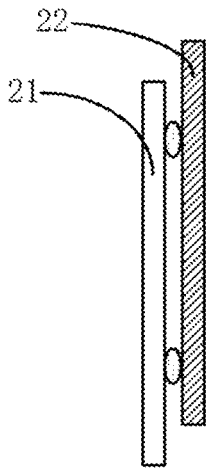
FIG. 4 is a diagram showing the right view of the mobile terminal shown in FIG. 3.

In this embodiment, the mobile terminal could be those shown in FIG. 2-FIG. 4. The mobile terminal comprises a cover. The cover could comprise a lower cover 22 and an upper cover 21 connected to the lower cover 22. The upper cover 21 is positioned above the lower cover 22. The upper cover 21 and the lower cover 22 could slide relatively to each other such that the cover of the mobile terminal is in the sliding away condition or the sliding in condition. As shown in FIG. 2, when the cover is in the sliding in condition, the upper cover 21 and the lower cover 22 could completely overlap each other. As shown in FIG. 3, when the cover is in the sliding away condition, the overlapped area of the upper cover 21 and the lower cover 22 is smaller than the overlapped area of the upper cover 21 and the lower cover 22 in the sliding in condition.

A display screen 211 could be positioned on the top surface of the upper cover 21. In addition, in order to achieve the full-screen display, the camera 221, the microphone (not shown) or other front-panel components that might affect the screen-to-body ratio could be positioned at the top end or bottom end of the top surface of the lower cover 22. Please note, the top end and the bottom end are opposite. Normally, the bottom end represents the location close to the bottom of the mobile terminal and the top end represents the location close to the top of the mobile terminal. Here, the top and the bottom of the mobile terminal represents the top and the bottom of the mobile terminal when the mobile terminal is being normally used.

Furthermore, a distance sensor could be placed in the cover of the mobile terminal. For example, as shown in FIG. 3, the distance sensor 222 could be placed at the top end of the lower cover 22. Here, the distance sensor 222 could be a supersonic distance sensor or a laser distance sensor.

Figure 5:
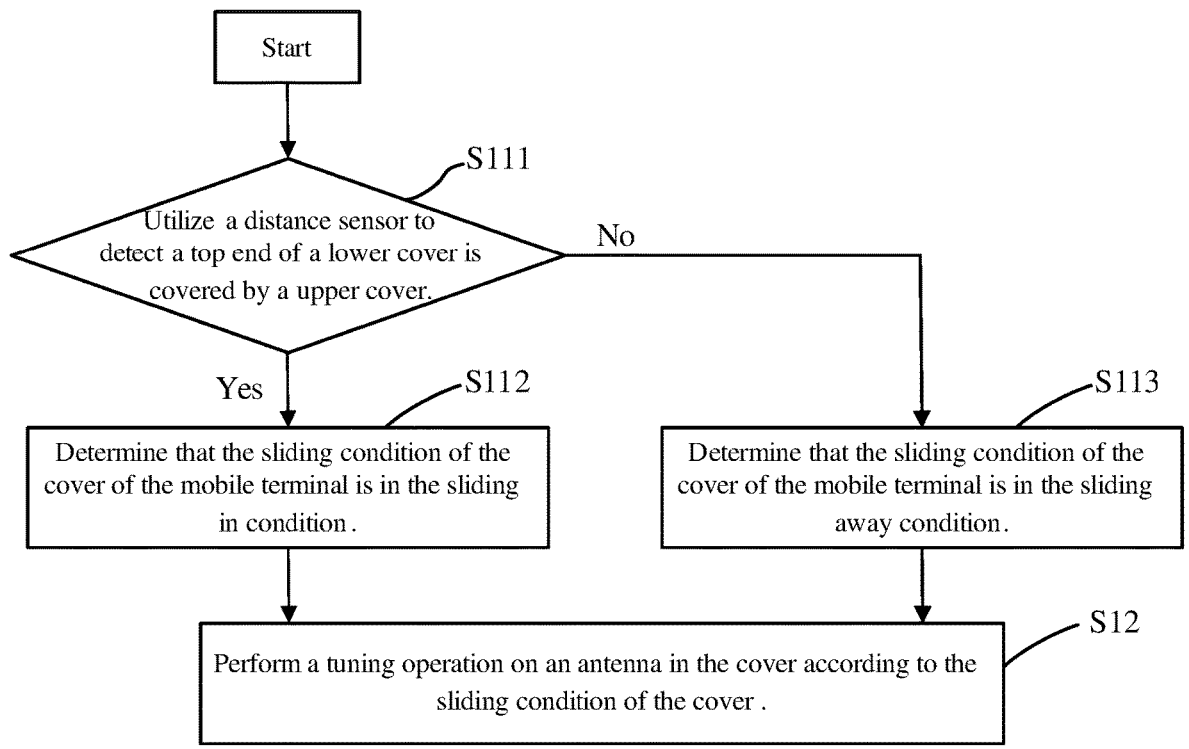
FIG. 5 is a flow chart of an antenna tuning method according to another embodiment of the present invention.

As shown in FIG. 5, the step S11 could comprise:

S111: Utilize the distance sensor to detect the top end of the lower cover is covered by the upper cover. If yes, then go to step S112. If not, then go to step S113.

As shown in FIG. 3, the distance sensor 222 could be placed in the top end of the lower cover 22 of the mobile terminal. When the cover is in the sliding away condition, the top end of the lower cover 222 is not covered by the upper cover 21. At this time, the top surface of the distance sensor 222 is not covered by the upper cover 21. When the cover is in the sliding in condition, the top end of the lower cover 22 is covered by the upper cover 21. At this time, the top surface of the distance sensor 222 is covered by the upper cover 21.

If the distance sensor 22 is a supersonic distance sensor, the supersonic distance sensor 22 could emit a supersonic wave having a specific frequency and receive a reflected supersonic wave. Specifically, the supersonic distance sensor 22 could be used to detect whether the signal amplitude of the reflected supersonic wave is larger than a predetermined threshold amplitude to ensure whether the top end of the lower cover 22 is covered by the upper cover 21.

In this embodiment, when the top surface of the supersonic distance sensor 22 is covered by the upper cover 21, the supersonic wave is largely reflected by the lower surface of the upper cover 21. Thus, the reflected supersonic wave will have a larger signal amplitude. On the contrary, the reflected supersonic wave will not have a large signal amplitude if the top surface of the supersonic distance sensor 22 is not covered.

S112: Determine that the sliding condition of the cover of the mobile terminal is in the sliding in condition.

For example, when the supersonic distance sensor detects that the signal amplitude of the reflected supersonic wave is larger than a predetermined threshold (such as 20), the supersonic distance sensor could determine that the top surface of the supersonic distance sensor is covered by the upper cover. That is, at this time, the top end of the lower cover is covered by the upper cover and the cover of the mobile terminal is in the sliding in condition.

S113: Determine that the sliding condition of the cover of the mobile terminal is in the sliding away condition.

Following the above example, when the supersonic distance sensor detects that the signal amplitude of the reflected supersonic wave is not larger than the predetermined threshold (such as 20), the supersonic distance sensor could determine that the top surface of the supersonic distance sensor is not covered by the upper cover. That is, at this time, the top end of the lower cover is not covered by the upper cover and the cover of the mobile terminal is in the sliding away condition.

S12: Perform a tuning operation on an antenna in the cover according to the sliding condition of the cover.

In this embodiment, as shown in FIG. 3, the antenna 223 of the mobile terminal could be placed at the top end or the bottom end of the lower cover 22. When the cover is in the sliding away condition, the antenna 223 is not covered by the upper cover 21.

In contrast, when the cover of the mobile terminal is in the sliding in condition, as shown in FIG. 2, the antenna 223 is covered by the upper cover 21. That is, when the cover is switched between the sliding away condition and the sliding in condition, the environment of the antenna 223 is also changed. This makes the antenna 223 have a frequency shift phenomenon. In order to solve the frequency shift issue of the antenna 223, a tuning operation is performed on the antenna 223 according to the sliding condition of the cover such that the performance of the antenna 223 could be optimized when the cover is in different sliding conditions.

The step S12 could comprise:

S121: Determine a predetermined tuning parameter corresponding to the sliding condition.

Specifically, the above-mentioned predetermined tuning parameter could comprise a first predetermined tuning parameter corresponding to the sliding away condition and a second predetermined tuning parameter corresponding to the sliding in condition.

In addition, the antenna tuning method could comprise the following step before the step S121:

Establish a data table. The data table stores a corresponding relationship between the sliding away condition and the first predetermined tuning parameter and a corresponding relationship between the sliding in condition and the second predetermined tuning parameter.

The step S121 could comprise:

S1-1: Obtain the first predetermined tuning parameter corresponding to the sliding away condition from the data table if the sliding condition is the sliding away condition.

S1-2: Obtain the second predetermined tuning parameter corresponding to the sliding in condition from the data table if the sliding condition is the sliding in condition.

S122: Perform a tuning operation on the antenna in the cover according to the predetermined tuning parameter.

In the cover of the mobile terminal, an antenna tuner could be placed. The antenna tuner is electrically connected to the antenna in the cover. Specifically, the antenna tuner could be placed in the lower cover and could comprise an adjustable resistor/capacitor. In this embodiment, the step S122 could comprise the following operations.

Adjust an antenna tuning parameter of the antenna tuner to be the predetermined tuning parameter to perform the tuning operation on the antenna. Here, the antenna tuning parameter comprises a capacitance and/or an inductance.

When the cover of the mobile terminal is in the sliding away condition, the antenna tuning parameter of the antenna tuner is adjusted to be the first predetermined tuning parameter. The capacitance/inductance in the first predetermined tuning parameter is used to adjust the resistance of the adjustable resistor and/or the capacitance of the adjustable capacitor in the antenna tuner in order to achieve an optical performance of the antenna when the cover is in the sliding away condition. When the cover of the mobile terminal is in the sliding in condition, the antenna tuning parameter of the antenna tuner is adjusted to be the second predetermined tuning parameter. The capacitance/inductance in the second predetermined tuning parameter is used to adjust the resistance of the adjustable resistor and/or the capacitance of the adjustable capacitor in the antenna tuner in order to achieve an optical performance of the antenna when the cover is in the sliding in condition.

In contrast to the conventional art, the antenna tuning method of an embodiment could detect the sliding condition of the cover and perform a tuning operation on the antenna in the cover according to the sliding condition. As previously mentioned, the sliding condition comprises the sliding away condition and the sliding in condition. In this way, the mobile terminal could have an optimal performance when the cover is in sliding in condition and the sliding away condition.

Figure 6:
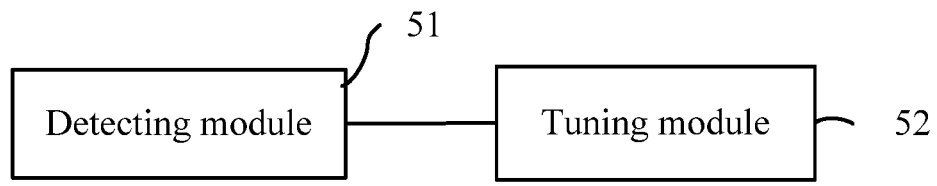
FIG. 6 is a diagram of an antenna tuning device according to an embodiment of the present invention.

Please refer to FIG. 6. FIG. 6 is a diagram of an antenna tuning device according to an embodiment of the present invention. As shown in FIG. 6, the antenna tuning device 50 is used in the mobile terminal.

The antenna tuning device comprises a detecting module 51 and a tuning module 52.

The detecting module 51 is configured to detect a sliding condition of a cover of the mobile terminal. Here, the sliding condition comprises a sliding away condition and a sliding in condition.

In this embodiment, the mobile terminal could be those shown in FIG. 2-FIG. 4. The mobile terminal comprises a cover. The cover could comprise a lower cover 22 and an upper cover 21 connected to the lower cover 22. The upper cover 21 is positioned above the lower cover 22. The upper cover 21 and the lower cover 22 could slide relatively to each other such that the cover of the mobile terminal is in the sliding away condition or the sliding in condition. As shown in FIG. 2, when the cover is in the sliding in condition, the upper cover 21 and the lower cover 22 could completely overlap each other. As shown in FIG. 3, when the cover is in the sliding away condition, the overlapped area of the upper cover 21 and the lower cover 22 is smaller than the overlapped area of the upper cover 21 and the lower cover 22 in the sliding in condition.

A display screen 211 could be positioned on the top surface of the upper cover 21. In addition, in order to achieve the full-screen display, the camera 221, the microphone (not shown) or other front-panel components that might affect the screen-to-body ratio could be positioned at the top end or bottom end of the top surface of the lower cover 22. Please note, the top end and the bottom end are opposite. Normally, the bottom end represents the location close to the bottom of the mobile terminal and the top end represents the location close to the top of the mobile terminal. Here, the top and the bottom of the mobile terminal represent the top and the bottom of the mobile terminal when the mobile terminal is being normally used.

Furthermore, a distance sensor could be placed in the cover of the mobile terminal. For example, as shown in FIG. 3, the distance sensor 222 could be placed at the top end of the lower cover 22. Here, the distance sensor 222 could be a supersonic distance sensor or a laser distance sensor.

The detecting module 51 could be used to perform the following steps S111, S112, and S113.

S111: Utilize the distance sensor to detect the top end of the lower cover is covered by the upper cover. If yes, then go to step S112. If not, then go to step S113.

As shown in FIG. 3, the distance sensor 222 could be placed in the top end of the lower cover 22 of the mobile terminal. When the cover is in the sliding away condition, the top end of the lower cover 222 is not covered by the upper cover 21. At this time, the top surface of the distance sensor 222 is not covered by the upper cover 21. When the cover is in the sliding in condition, the top end of the lower cover 22 is covered by the upper cover 21. At this time, the top surface of the distance sensor 222 is covered by the upper cover 21.

If the distance sensor 22 is a supersonic distance sensor, the supersonic distance sensor 22 could emit a supersonic wave having a specific frequency and receive a reflected supersonic wave. Specifically, the supersonic distance sensor 22 could be used to detect whether the signal amplitude of the reflected supersonic wave is larger than a predetermined threshold amplitude to ensure whether the top end of the lower cover 22 is covered by the upper cover 21.

In this embodiment, when the top surface of the supersonic distance sensor 22 is covered by the upper cover 21, the supersonic wave is largely reflected by the lower surface of the upper cover 21. Thus, the reflected supersonic wave will have a larger signal amplitude. On the contrary, the reflected supersonic wave will not have a large signal amplitude if the top surface of the supersonic distance sensor 22 is not covered.

S112: Determine that the sliding condition of the cover of the mobile terminal is in the sliding in condition.

For example, when the supersonic distance sensor detects that the signal amplitude of the reflected supersonic wave is larger than a predetermined threshold (such as 20), the supersonic distance sensor could determine that the top surface of the supersonic distance sensor is covered by the upper cover. That is, at this time, the top end of the lower cover is covered by the upper cover and the cover of the mobile terminal is in the sliding in condition.

S113: Determine that the sliding condition of the cover of the mobile terminal is in the sliding away condition.

Following the above example, when the supersonic distance sensor detects that the signal amplitude of the reflected supersonic wave is not larger than the predetermined threshold (such as 20), the supersonic distance sensor could determine that the top surface of the supersonic distance sensor is not covered by the upper cover. That is, at this time, the top end of the lower cover is not covered by the upper cover and the cover of the mobile terminal is in the sliding away condition.

The tuning module 52 is configured to perform a tuning operation on an antenna in the cover according to the sliding condition of the cover.

In this embodiment, as shown in FIG. 3, the antenna 223 of the mobile terminal could be placed at the top end or the bottom end of the lower cover 22. When the cover is in the sliding away condition, the antenna 223 is not covered by the upper cover 21.

In contrast, when the cover of the mobile terminal is in the sliding in condition, as shown in FIG. 2, the antenna 223 is covered by the upper cover 21. That is, when the cover is switched between the sliding away condition and the sliding in condition, the environment of the antenna 223 is also changed. This makes the antenna 223 have a frequency shift phenomenon. In order to solve the frequency shift issue of the antenna 223, a tuning operation is performed on the antenna 223 according to the sliding condition of the cover such that the performance of the antenna 223 could be optimized when the cover is in different sliding conditions.

The tuning module 52 could comprise a determining unit and a tuning unit.

The determining unit is configured to determine a predetermined tuning parameter corresponding to the sliding condition.

Specifically, the above-mentioned predetermined tuning parameter could comprise a first predetermined tuning parameter corresponding to the sliding away condition and a second predetermined tuning parameter corresponding to the sliding in condition.

The antenna tuning device 50 could further comprise an establishing module.

The establishing module is configured to, before the predetermined tuning parameter is determined, establish a data table, storing a corresponding relationship between the sliding away condition and a first predetermined tuning parameter and a corresponding relationship between the sliding in condition and a second predetermined tuning parameter.

The determining unit could be used to perform the following steps S1-1 and S1-2.

S1-1: Obtain the first predetermined tuning parameter corresponding to the sliding away condition from the data table if the sliding condition is the sliding away condition.

S1-2: Obtain the second predetermined tuning parameter corresponding to the sliding in condition from the data table if the sliding condition is the sliding in condition.

The tuning unit is configured to perform the tuning operation on the antenna according to the predetermined tuning parameter.

In addition, an antenna tuner could be placed in the cover of the mobile terminal. The antenna tuner is electrically connected to the antenna. The antenna tuner could be placed in the lower cover and could comprise an adjustable capacitor and/or an adjustable capacitor. The tuning unit could be used to adjust the antenna tuning parameter to be the predetermined tuning parameter to perform the tuning operation on the antenna. Here, the antenna tuning parameter and the predetermined tuning parameter are corresponding to each other and comprise at least capacitance and/or inductance.

Specifically, when the cover of the mobile terminal is in the sliding away condition, the tuning unit adjusts the antenna tuning parameter of the antenna tuner to be the first predetermined tuning parameter. That is, the capacitance/inductance in the first predetermined tuning parameter is used to adjust the resistance of the adjustable resistor and/or the capacitance of the adjustable capacitor in the antenna tuner in order to achieve an optical performance of the antenna when the cover is in the sliding away condition.

When the cover of the mobile terminal is in the sliding in condition, the tuning unit adjusts the antenna tuning parameter of the antenna tuner to be the second predetermined tuning parameter. That is, the capacitance/inductance in the second predetermined tuning parameter is used to adjust the resistance of the adjustable resistor and/or the capacitance of the adjustable capacitor in the antenna tuner in order to achieve an optical performance of the antenna when the cover is in the sliding in condition.

In the actual implementation, the above-mentioned sub-units, units and modules could be an independent component or they can be implemented as a combination or multiple components. The actual implementation of the above-mentioned sub-units, units and modules could be referred to the above embodiments and thus omitted here.

In contrast to the conventional art, the antenna tuning device of an embodiment could detect the sliding condition of the cover and perform a tuning operation on the antenna in the cover according to the sliding condition. As previously mentioned, the sliding condition comprises the sliding away condition and the sliding in condition. In this way, the mobile terminal could have an optimal performance when the cover is in sliding in condition and the sliding away condition.

Figure 7:
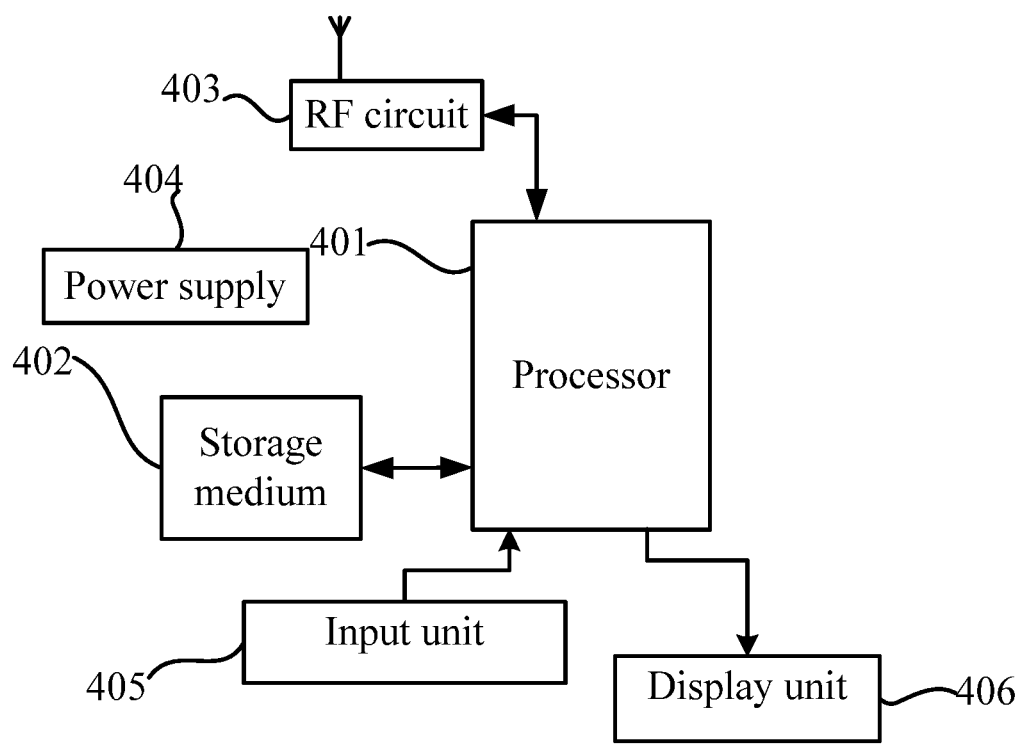
FIG. 7 is a diagram of a mobile terminal according to another embodiment of the present invention.

According to an embodiment of the present invention, a mobile terminal is disclosed. Please refer to FIG. 7. FIG. 7 is a diagram of a mobile terminal according to another embodiment of the present invention.

The mobile terminal could comprise a processor 401 having one or more processing cores, a storage device 402 having one or more computer readable media, an RF circuit 403, a power supply 404, an input unit 405, and a display unit 406.

It could be understood by a person skilled in the art that the structure of the mobile terminal shown in FIG. 7 is not a limitation of the present invention. It could comprise more or less components or a combination or arrangement of the components shown in FIG. 7.

The processor 401 is a control center of the mobile terminal, and connects various parts of the terminal by using various interfaces and lines. By running or executing the software program and/or module stored in the storage device 402, and invoking data stored in the storage device 402, the processor 401 performs various functions and data processing of the mobile terminal, thereby performing overall monitoring on the mobile phone. Optionally, the processor 401 may include one or more processing cores. Preferably, the processor 401 may integrate an application processor and a modem. The application processor mainly processes an operating system, a user interface, an application program, and the like. The modem mainly processes wireless communication. It may be understood that, the foregoing modem may not be integrated into the processor 401.

The storage device 402 may be configured to store a software program and module. The processor 401 runs the software program and module stored in the storage device 402, to implement various functional applications and data processing. The storage device 402 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the storage device 402 may include a high speed random access memory, and may also include a non-volatile memory, such as at least one magnetic disk storage device, a flash memory device, or another volatile solid-state storage device. Correspondingly, the storage device 402 may further include a memory controller, so that the processor 401 and the input unit 405 access the storage device 402.

The RF circuit 403 may be configured to receive and send a signal during an information receiving and sending process or a conversation process. Specifically, after receiving downlink information from a base station, the RF circuit 403 delivers the downlink information to one or more processors 180 for processing, and sends related uplink data to the base station. Generally, the RF circuit 403 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 403 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The mobile terminal further includes the power supply 404 (such as a battery) for supplying power to the components. Preferably, the power supply may be logically connected to the processor 401 by using a power supply management system, thereby implementing functions, such as charging, discharging, and power consumption management, by using the power supply management system. The power supply 404 may further include any component, such as one or more direct current or alternate current power supplies, a re-charging system, a power supply fault detection circuit, a power supply converter or an inverter, and a power supply state indicator.

The input unit 405 may be configured to receive input digit or character information, and generate keyboard, mouse, joystick, optical, or track ball signal input related to the user setting and function control. Specifically, the input unit 405 may include a touch-sensitive surface and other input device. The touch-sensitive surface may also be referred to as a touch screen or a touch panel, and may collect a touch operation of a user on or near the touch-sensitive surface (such as an operation of a user on or near the touch-sensitive surface by using any suitable object or attachment, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 401. Moreover, the touch controller can receive and execute a command sent from the processor 401. In addition, the touch-sensitive surface may be implemented by using various types, such as a resistive type, a capacitance type, an infrared type, and a surface sound wave type. In addition to the touch-sensitive surface, the input unit 405 may further include the another input device. Specifically, the another input device may include, but is not limited to, one or more of a physical keyboard, a functional key (such as a volume control key or a switch key), a track ball, a mouse, and a joystick.

The display unit 406 may be configured to display information input by the user or information provided for the user, and various graphical user ports of the mobile terminal. The graphical user ports may be formed by a graph, a text, an icon, a video, and any combination thereof. The display unit 406 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 401, so as to determine a type of a touch event. Then, the processor 401 provides corresponding visual output on the display panel according to the type of the touch event. Although, in FIG. 7, the touch-sensitive surface and the display panel are used as two separate parts to implement input and output functions, in some embodiments, the touch-sensitive surface and the display panel may be integrated to implement the input and output functions.

Furthermore, although not shown, the mobile terminal could further comprise a camera and a Bluetooth module. Here, further illustration is omitted here. The processor 401 of the mobile terminal could execute the following instructions to load the executable documents corresponding to one or more applications into the storage device 402 and the processor 401 executes the applications stored in the storage device 402 to perform the operations of:

detecting a sliding condition of a cover of the mobile terminal, wherein the sliding condition comprises a sliding away condition and a sliding in condition; and performing a tuning operation on an antenna in the cover according to the sliding condition of the cover.

In contrast to the conventional art, the antenna tuning method of an embodiment could detect a sliding condition of a cover of the mobile terminal, where the sliding condition comprises a sliding away condition and a sliding in condition; and perform a tuning operation on an antenna in the cover according to the sliding condition of the cover. In this way, the antenna tuning method could ensure the mobile terminal could have an optimal antenna performance when the cover of the mobile terminal is in the sliding in condition and the sliding away condition.

A person having ordinary skill in the art can understand that all or part of steps can be performed by related hardware devices driven by instructions stored in a computer readable storage medium such as a random access memory (RAM), a read only memory (ROM), and a portable compact disc read only memory (CDROM).

Above are embodiments of the present invention, which does not limit the scope of the present invention. Any modifications, equivalent replacements or improvements within the spirit and principles of the embodiment described above should be covered by the protected scope of the invention.

What is claimed is:

1. An antenna tuning method used in a mobile terminal, the antenna tuning method comprising:
    controlling a supersonic distance sensor placed in a cover of the mobile terminal to emit a supersonic wave having a specific frequency and utilizing the supersonic distance sensor to receive a reflected supersonic wave;
    determining whether a signal amplitude of the reflected supersonic wave is larger than a predetermined threshold amplitude to detect whether an upper end of a lower cover is covered by a upper cover, wherein the cover comprises the lower cover and the upper cover connected to the lower cover, the upper cover and the lower cover are capable of relatively sliding such that the cover lies in a sliding away condition or a sliding in condition;
    determining that a sliding condition is the sliding in condition if the upper end of the lower cover is covered by the upper cover; and
    determining that the sliding condition is the sliding away condition if the upper end of the lower cover is not covered by the upper cover; and
    performing a tuning operation on an antenna in the cover according to the sliding condition of the cover.

2. The antenna tuning method of claim 1, wherein the step of performing the tuning operation on the antenna in the cover according to the sliding condition of the cover comprises:
    determining a predetermined tuning parameter corresponding to the sliding condition; and
    performing the tuning operation on the antenna according to the predetermined tuning parameter.

3. The antenna tuning method of claim 2, further comprising following steps before the step of determining the predetermined tuning parameter corresponding to the sliding condition:
    establishing a data table, storing a corresponding relationship between the sliding away condition and a first predetermined tuning parameter and a corresponding relationship between the sliding in condition and a second predetermined tuning parameter; and
    the step of the determining the predetermined tuning parameter corresponding to the sliding condition comprises:
    obtaining the first predetermined tuning parameter corresponding to the sliding away condition from the data table if the sliding condition is the sliding away condition; and
    obtaining the second predetermined tuning parameter corresponding to the sliding in condition from the data table if the sliding condition is the sliding in condition.

4. The antenna tuning method of claim 2, wherein an antenna tuner is positioned in the cover, the antenna tuner is electrically connected to the antenna in the cover and the step of performing the tuning operation on the antenna according to the predetermined tuning parameter comprises:
    adjusting an antenna tuning parameter of the antenna tuner to be the predetermined tuning parameter to perform the tuning operation on the antenna; wherein the antenna tuning parameter comprises a capacitance and/or an inductance.

5. The antenna tuning method of claim 4, wherein the step of adjusting the antenna tuning parameter of the antenna tuner to be the predetermined tuning parameter comprises:
    adjusting the antenna tuning parameter of the antenna tuner to be the first predetermined tuning parameter when the cover lies in sliding away condition; and
    adjusting the antenna tuning parameter of the antenna tuner to be the second predetermined tuning parameter when the cover lies in sliding in condition.

6. An antenna tuning device, used in a mobile terminal, the antenna tuning device comprising:
    a detecting module, configured to perform operations comprising:
        controlling a supersonic distance sensor placed in a cover of the mobile terminal to emit a supersonic wave having a specific frequency and utilizing the supersonic distance sensor to receive a reflected supersonic wave;
        determining whether a signal amplitude of the reflected supersonic wave is larger than a predetermined threshold amplitude to detect whether an upper end of a lower cover is covered by a upper cover, wherein the cover comprises the lower cover and the upper cover connected to the lower cover, the upper cover and the lower cover are capable of relatively sliding such that the cover lies in a sliding away condition or a sliding in condition;
        determining that a sliding condition is the sliding in condition if the upper end of the lower cover is covered by the upper cover; and
        determining that the sliding condition is the sliding away condition if the upper end of the lower cover is not covered by the upper cover; and
    a tuning module, configured to perform a tuning operation on an antenna in the cover according to the sliding condition of the cover.

7. The antenna tuning device of claim 6, wherein the tuning module comprises:

a determining unit, configured to determine a predetermined tuning parameter corresponding to the sliding condition; and a tuning unit, configured to perform the tuning operation on the antenna according to the predetermined tuning parameter.

8. The antenna tuning device of claim 7, further comprising:

an establishing module, configured to, before the predetermined tuning parameter is determined, establish a data table, storing a corresponding relationship between the sliding away condition and a first predetermined tuning parameter and a corresponding relationship between the sliding in condition and a second predetermined tuning parameter; and the determining unit is configured to obtain the first predetermined tuning parameter corresponding to the sliding away condition from the data table if the sliding condition is the sliding away condition, and to obtain the second predetermined tuning parameter corresponding to the sliding in condition from the data table if the sliding condition is the sliding in condition.

9. The antenna tuning device of claim 7, further comprising:

an antenna tuner, positioned in the cover and electrically connected to the antenna, configured to adjust an antenna tuning parameter of the antenna tuner to be the predetermined tuning parameter to perform the tuning operation on the antenna; wherein the antenna tuning parameter comprises a capacitance and/or an inductance.

10. The antenna tuning device of claim 9, wherein the operation of adjusting the antenna tuning parameter of the antenna tuner to be the predetermined tuning parameter comprises:

adjusting the antenna tuning parameter of the antenna tuner to be the first predetermined tuning parameter when the cover lies in sliding away condition; and adjusting the antenna tuning parameter of the antenna tuner to be the second predetermined tuning parameter when the cover lies in sliding in condition.

11. A non-transitory computer readable medium in a mobile terminal and storing a plurality of instructions executable by a processing unit to perform following operations:

controlling a supersonic distance sensor placed in a cover of the mobile terminal to emit a supersonic wave having a specific frequency and utilizing the supersonic distance sensor to receive a reflected supersonic wave;

determining whether a signal amplitude of the reflected supersonic wave is larger than a predetermined threshold amplitude to detect whether an upper end of a lower cover is covered by a upper cover, wherein the cover comprises the lower cover and the upper cover connected to the lower cover, the upper cover and the lower cover are capable of relatively sliding such that the cover lies in a sliding away condition or a sliding in condition;

determining that a sliding condition is the sliding in condition if the upper end of the lower cover is covered by the upper cover;

determining that the sliding condition is the sliding away condition if the upper end of the lower cover is not covered by the upper cover;

and performing a tuning operation on an antenna in the cover according to the sliding condition of the cover.

12. The non-transitory computer readable medium of claim 11, wherein the operation of performing the tuning operation on the antenna in the cover according to the sliding condition of the cover comprises:

determining a predetermined tuning parameter corresponding to the sliding condition; and performing the tuning operation on the antenna according to the predetermined tuning parameter.

13. The non-transitory computer readable medium of claim 12, wherein before the operation of determining the predetermined tuning parameter corresponding to the sliding condition, the plurality of instructions are executable by the processing unit to perform following operations:

establishing a data table, storing a corresponding relationship between the sliding away condition and a first predetermined tuning parameter and a corresponding relationship between the sliding in condition and a second predetermined tuning parameter; and the step of the determining the predetermined tuning parameter corresponding to the sliding condition comprises:

obtaining the first predetermined tuning parameter corresponding to the sliding away condition from the data table if the sliding condition is the sliding away condition; and obtaining the second predetermined tuning parameter corresponding to the sliding in condition from the data table if the sliding condition is the sliding in condition.

14. The non-transitory computer readable medium of claim 12, wherein an antenna tuner is positioned in the cover, the antenna tuner is electrically connected to the antenna in the cover and the operation of performing the tuning operation on the antenna according to the predetermined tuning parameter comprises:

adjusting an antenna tuning parameter of the antenna tuner to be the predetermined tuning parameter to perform the tuning operation on the antenna; wherein the antenna tuning parameter comprises a capacitance and/or an inductance.

* * * * *